Patented June 2, 1953

2,640,855

UNITED STATES PATENT OFFICE 2,640,855

METHOD FOR THE PRODUCTION OF N-METHYL-1-ISOBUTYLISOPEN- TYLAMINE

John B. Tindall, Terre Haute, Ind., assignor to Commercial Solvents Corporation, Terre Haute, Ind., a corporation of Maryland No Drawing. Application February 23, 1951, Serial No. 212,511

6 Claims. (Cl. 260—583)

My invention relates to a process for the preparation of N-methyl-1-isobutylisopentylamine and more particularly it relates to a process for the preparation of M-methyl-1-isobutylisopentylamine by the reductive amination of diisobutyl ketone with methylamine.

It is known that some secondary amines may be prepared by hydrogenating the reaction product of a ketone and a primary amine under suitable conditions. However, the methods found suitable for the preparation of other secondary amines have not been successful for the preparation of N-methyl-1-isobutylisopentylamine. In general, the use of catalysts derived from nickel, or various compounds thereof, are recommended for the preparation of secondary amines. But none of the catalysts of this type, including the highly recommended Raney nickel (U. S. Patent No. 1,628,190) is suitable for the preparation of N-methyl-1-isobutylisopentylamine.

I have now discovered that N-methyl-1-isobutylisopentylamine can be prepared by the hydrogenation, under elevated temperature and pressure, of mixtures of diisobutylketone, methylamine and a solvent, in the presence of a modified copper oxide catalyst. By my new procedure, N-methyl-1-isobutylisopentylamine is obtained in good yields and quality.

In carrying out the process of my invention, the reaction may be effected in a hydrogenation apparatus of conventional design. The reaction vessel is charged with diisobutyl ketone, anhydrous methylamine, a solvent, and the catalyst. Hydrogenation is then introduced up to at least 500 pounds per square inch pressure. Thereafter, the bomb is heated to temperatures ranging between 140 and 200° C. During the hydrogenation period, the bomb is preferably agitated. After hydrogen absorption appears to be complete, the bomb is withdrawn from the hydrogenation apparatus proper and the catalyst is allowed to settle and the liquid removed by decantation. The liquid is then distilled until free from excess methylamine and then acidified. The non-basic materials are distilled out and the amine is liberated by addition of caustic. The amine layer is then separated and distilled. After a small quantity of water comes over a small cut is obtained to 175° and the pure product is collected at 175–179° C. A relatively small residue (purity 80–90%) is allowed to accumulate and reworked with the heads cut.

The catalyst used in my process is a modified copper oxide catalyst such as copper chromite or co-precipitated cupric oxide-calcium fluoride. The copper chromite catalyst can be produced by the method of Calingaert and Edgar described in Ind. Eng. Chem. 26, 878–880 (1934). This method consists generally of reacting a copper salt, such as the sulfate, with the dichromate of an alkali metal such as sodium, and ammonia, to form a precipitate of copper ammonium chromate, which is then washed, dried and roasted to produce copper chromite suitable for use in my process. Co-precipitated copper oxide-calcium fluoride can be produced by the method of Stengel and Maple described in U. S. Patent No. 2,381,316 which comprises reacting copper sulfate, sodium fluoride, calcium chloride and sodium hydroxide to form a precipitate consisting of cupric hydroxide and calcium fluoride which is then separated, washed and dried to produce the co-precipitate of cupric oxide-calcium fluoride catalyst. Other methods can be used for producing the catalyst, the above procedure being cited merely as a convenient and desirable method. In addition, other modified copper oxides can be used as catalysts in my process.

The ratio of the reactants, namely diisobutyl ketone and methylamine, can be varied over a fairly wide range. Changes in the ratio of reactants, however, affect to a considerable degree the yields of N-methyl-1-isobutylisopentylamine obtained as a result of the reaction. In general, it can be stated that the reactants should be used in approximately equimolecular proportion, with preferably a slight excess of amine. A large excess of amine gives better conversions based on ketone, while a deficiency of amine gives better conversion based on the amine.

As previously indicated, it is necessary that the reaction comprising my invention be carried out in the presence of a solvent. The purpose of the solvent is to blend water of reaction with the ketone and products to keep the catalyst from being preferentially wetted by water and rendered inactive. I have found that any solvent which is inert to the reactants under the reaction conditions employed and is not water-immiscible can be used. I prefer to use the lower alcohols such as methyl alcohol, ethyl alcohol, propyl alcohol and butyl alcohol. The quantity of inert solvent used in any particular reaction is not a critical feature of my invention, it only being necessary that sufficient amounts be used to dissolve the reactants.

The temperatures employed in my process are preferably of the order of 150–180° C., but can extend over a range of about 140° to about 200°

C., the optimum reaction temperature being apparently about 160° C.

In carrying out my process superatmospheric pressures above 500 pounds per square inch are used. Pressures near the lower limit require a longer reaction time and are characterized by lower yields. As the pressure increases, the reaction time is decreased, and there is apparently no upper limit to the pressure which can be used except that determined by the strength of the equipment. I prefer to operate at pressures between about 1000 and 3000 pounds per square inch.

The reaction is gauged by the pressure drop in the reaction chamber. During the reaction, hydrogen is added whenever the pressure in the reaction vessel drops below the selected operating pressure. The reaction is complete when no further pressure drop occurs, thus indicating that hydrogen is no longer being absorbed.

It will be apparent that my process is not limited to a batch operation as described above, but can also be carried out by passing a slurry of the powdered catalyst and the liquid reaction mixture through a column in contact with hydrogen gas under proper conditions of temperature and pressure. Still another procedure consists of passing the reaction mixture through a stationary bed of pelleted or supported metal chromite catalysts enclosed in a reaction vessel of suitable design.

It has been found that in some runs the co-precipitated cupric oxide-calcium fluoride catalyst has a tendency to agglomerate into pellets with a metallic lustre. This agglomeration undoubtedly decreases the activity of the catalyst, and it has been found that the addition of carbon to a catalyst prevents the agglomeration and apparently decreases the reaction time.

Because the boiling point of the N-methyl-1-isobutylisopentylamine (176° C.) is close to those of diisobutyl ketone (164–166° C.) and diisobutylcarbinol (172–174° C.), the latter compound being formed by a side reaction, separation of the pure product by fractionation is not feasible. It is possible to get a fraction of a purity of better than 90° by such method but a larger proportion of the product has a lower purity. A pure product can be obtained by acidifying the crude mixture, distilling out the non-basic impurities and liberating the amine with caustic.

In the table below, are given the results of a series of bomb runs employing the procedure of my invention. In each of these runs, a bomb was charged with diisobutyl ketone, catalyst, and methanol solvent and cooled in Dry Ice, and the anhydrous methylamine then added. In some runs a solution of amine in methanol was charged at room temperature. The bomb was sealed and the hydrogen introduced to the initial pressure noted in the table at about 20° C. The bomb was then heated to the operating temperature and the maximum pressure was noted. It was not necessary to add more hydrogen in these runs. When hydrogen absorption stopped the bomb was cooled and the catalyst removed by filtration or decantation. The filtrate was distilled through a packed column until excess monomethylamine and part of the methanol had been removed. The residue was then titrated to determine conversion based on ketone.

In the table, the designation "catalyst type 333" refers to a co-precipitated copper oxide-calcium fluoride catalyst prepared according to the method of U. S. Patent No. 2,381,316. It will be observed that the same batch of catalyst was used in all of the runs Nos. A–I, inclusive. The results indicate that not only is the co-precipitated copper oxide-calcium fluoride catalyst very effective for the preparation of N-methyl-1-isobutyl-isopentylamine, but that the catalyst has an extremely long life for the reaction.

*Table*

| Run No. | Moles Ketone | Moles Amine | MeOH, ml. | Catalyst Type | Catalyst Wt., g. | Temp., °C. | Pressure, p.s.i. Initial | Pressure, p.s.i. Maximum | Time, hours | Conversion, Percent |
|---|---|---|---|---|---|---|---|---|---|---|
| 5024 | 1.41 | 1.43 | 460 | Copper chromite | 20 | 180 | 1,500 | 2,100 | 12 | 73 |
| 5029 | 1.41 | 1.69 | 500 | 333 | 20 | 160 | 1,500 | 2,410 | 13 | 84 |
| 5069 | 1.41 | 1.6 | 500 | 333 | 20 | 160 | 1,375 | 2,025 | 6 | 83 |
| A | 1.4 | 1.6 | 500 | 333 | 30 | 160 | 1,500 | 2,200 | 7 | 104 |
| B | 1.4 | 1.6 | 500 | From A | | 160 | 1,500 | 2,325 | 4 | 94 |
| C | 1.4 | 1.6 | 500 | From B | | 160 | 1,500 | 2,350 | 3 | 84 |
| D | 1.4 | 1.6 | 500 | From C | | 160 | 1,500 | 2,435 | 4 | 94 |
| E | 1.4 | 1.6 | 500 | From D | | 160 | 1,500 | 2,500 | 3 | 89 |
| F | 1.4 | 1.6 | 500 | From E | | 160 | 1,500 | 2,410 | 5.5 | 89 |
| G | 1.4 | 1.6 | 500 | From F | | 160 | 1,500 | 2,500 | 3 | 89 |
| H | 1.4 | 1.6 | 500 | From G | | 160 | 1,500 | 2,550 | 4 | 80 |
| I | 1.4 | 1.6 | 500 | From H | | 160 | 1,500 | 2,650 | 3.5 | 93 |

It is to be understood that I am not limited to the preferred procedure as herein set out and that any equivalents or changes which would occur to one skilled in the art are to be construed as lying within the scope of my disclosure and the appended claims.

I claim:

1. A process for the production of N-methyl-1-isobutylisopentylamine which comprises reacting under superatmospheric pressures at elevated temperatures and in the presence of an inert solvent and a modified copper oxide catalyst selected from the group consisting of copper chromite and co-precipitated copper oxide-calcium fluoride, a mixture of diisobutyl ketone, methylamine and hydrogen.

2. A process for the manufacture of N-methyl-1-isobutylisopentylamine which comprises reacting under superatmospheric pressures at elevated temperatures and in the presence of an inert solvent and a copper chromite catalyst, a mixture of diisobutyl ketone, methylamine and hydrogen.

3. A process for the manufacture of N-methyl-1-isobutylisopentylamine which comprises reacting under superatmospheric pressures at elevated temperatures and in the presence of an inert solvent and a coprecipitated copper oxide-calcium fluoride catalyst, a mixture of diisobutyl ketone, methylamine and hydrogen.

4. A process for the preparation of N-methyl-1-isobutylisopentylamine which comprises reacting under superatmospheric pressures ranging from 500 to 3000 pounds per square inch and at temperatures between about 140–200° C., in the presence of an inert solvent and a copper chromite catalyst, a mixture of diisobutyl ketone, methylamine and hydrogen.

5. A process for the preparation of N-methyl-1-isobutylisopentylamine which comprises reacting methylamine, hydrogen and diisobutyl ketone at a pressure between about 500 and 3000 pounds per square inch and at a temperature of about 140–200° C. in the presence of an inert solvent and a co-precipitated copper oxide-calcium fluoride catalyst.

6. A process for the preparation of N-methyl-1-isobutylisopentylamine which comprises reacting methylamine, hydrogen and diisobutyl ketone at a pressure between about 500 and 3000 pounds per square inch and at a temperature between about 140–200° C. in the presence of a lower aliphatic alcohol solvent and a modified copper oxide catalyst selected from the group consisting of copper chromite and co-precipitated copper oxide-calcium fluoride.

JOHN B. TINDALL.

References Cited in the file of this patent

UNITED STATES PATENTS

| Number | Name | Date |
|---|---|---|
| 2,045,574 | Adkins et al. | June 30, 1936 |
| 2,217,630 | Winans | Oct. 8, 1940 |
| 2,294,442 | Bersworth | Sept. 1, 1942 |
| 2,381,316 | Stengal | Aug. 7, 1945 |
| 2,414,031 | Emerson | Jan. 7, 1947 |
| 2,533,723 | Dombrow | Dec. 12, 1950 |

FOREIGN PATENTS

| Number | Country | Date |
|---|---|---|
| 421,718 | Great Britain | Dec. 27, 1934 |
| 436,414 | Great Britain | Oct. 10, 1935 |

OTHER REFERENCES

Rohrmann et al.: J. Am. Chem. Soc. (1944), vol. 66, pp. 1516–1520